United States Patent
Vairo et al.

(10) Patent No.: US 11,454,022 B2
(45) Date of Patent: Sep. 27, 2022

(54) GLASS FIBER-REINFORCED POLYURETHANE/POLYISOCYANURATE FOAM INSULATION BOARD

(71) Applicant: Dow Global Technologies LLC, Midland, MI (US)

(72) Inventors: Giuseppe Vairo, Correggio (IT); Luigi Bertucelli, Correggio (IT); Elena Ferrari, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 67 days.

(21) Appl. No.: 16/766,881

(22) PCT Filed: Aug. 24, 2018

(86) PCT No.: PCT/US2018/047840
§ 371 (c)(1),
(2) Date: May 26, 2020

(87) PCT Pub. No.: WO2019/108281
PCT Pub. Date: Jun. 6, 2019

(65) Prior Publication Data
US 2020/0362553 A1    Nov. 19, 2020

(30) Foreign Application Priority Data
Nov. 28, 2017   (IT) ................. 102017000136495

(51) Int. Cl.
*E04B 1/76* (2006.01)
*B32B 5/02* (2006.01)
(Continued)

(52) U.S. Cl.
CPC ............ *E04B 1/7625* (2013.01); *B32B 5/022* (2013.01); *B32B 5/20* (2013.01); *B32B 5/245* (2013.01);
(Continued)

(58) Field of Classification Search
None
See application file for complete search history.

(56) References Cited

U.S. PATENT DOCUMENTS 3,991,252 A * 11/1976 Kolakowski ............ E04B 1/941
427/403
4,042,746 A   8/1977 Hofer
(Continued)

FOREIGN PATENT DOCUMENTS

BE    893737 A    11/1982
CN   1126138 A     7/1996
(Continued)

OTHER PUBLICATIONS

International Search Report and Written Opinion pertaining to PCT/US2018/047840, dated Nov. 26, 2018.
(Continued)

*Primary Examiner* — Chinessa T. Golden
(74) *Attorney, Agent, or Firm* — Dinsmore & Shohl LLP

(57) ABSTRACT

External thermal insulation composite systems described herein include a concrete or masonry wall and a thermal insulation board on the concrete or masonry wall. The thermal insulation board includes a polyurethane/polyisocyanurate foam having a density of less than 70 kg/m³ according to ASTM D 1622. Methods of preparing the external thermal insulation composite systems and the thermal insulation boards are also described.

9 Claims, 1 Drawing Sheet

(51) Int. Cl.
  *B32B 5/20*   (2006.01)
  *B32B 5/24*   (2006.01)
  *B32B 7/12*   (2006.01)
  *B32B 9/00*   (2006.01)
  *B32B 17/04*  (2006.01)

(52) U.S. Cl.
  CPC ............... *B32B 7/12* (2013.01); *B32B 9/002* (2013.01); *B32B 17/04* (2013.01); *B32B 2250/05* (2013.01); *B32B 2262/101* (2013.01); *B32B 2266/0214* (2013.01); *B32B 2266/08* (2013.01); *B32B 2307/304* (2013.01); *B32B 2307/734* (2013.01); *B32B 2419/00* (2013.01)

(56) References Cited

U.S. PATENT DOCUMENTS

| | | | |
|---|---|---|---|
| 4,500,656 A | 2/1985 | Rasshofer et al. | |
| 4,555,442 A | 11/1985 | Frentzel | |
| 4,735,970 A | 4/1988 | Sommerfeld et al. | |
| 4,869,037 A * | 9/1989 | Murphy | E04B 1/642 52/748.11 |
| 6,743,483 B2 | 6/2004 | Rochefort et al. | |
| 8,397,465 B2 | 3/2013 | Hansbro et al. | |
| 8,426,017 B2 | 4/2013 | Paradis et al. | |
| 8,470,436 B1 | 6/2013 | Paradis et al. | |
| 8,479,467 B2 | 7/2013 | Johnson et al. | |
| 8,597,779 B2 | 12/2013 | Paradis et al. | |
| 8,617,699 B2 | 12/2013 | Paradis et al. | |
| 2001/0014387 A1* | 8/2001 | Giampaolo | C08G 18/5027 428/314.4 |
| 2004/0180978 A1 | 9/2004 | Dreier | |
| 2006/0258762 A1 | 11/2006 | Dobransky et al. | |
| 2008/0234402 A1* | 9/2008 | Lehmann | C08G 18/4018 521/118 |
| 2008/0269365 A1 | 10/2008 | Andrew et al. | |
| 2010/0031603 A1 | 2/2010 | Letts et al. | |
| 2011/0229693 A1 | 9/2011 | Maurer et al. | |
| 2011/0258762 A1 | 10/2011 | Schultz | |
| 2011/0313072 A1 | 12/2011 | Maurer et al. | |
| 2012/0317914 A1 | 12/2012 | Bomberg et al. | |
| 2015/0111001 A1 | 4/2015 | Sagnard et al. | |
| 2017/0313806 A1* | 11/2017 | Yu | C08J 9/144 |
| 2017/0326849 A1 | 11/2017 | White et al. | |

FOREIGN PATENT DOCUMENTS

| | | |
|---|---|---|
| CN | 1281401 A | 1/2001 |
| CN | 1455791 A | 11/2003 |
| CN | 2606140 Y | 3/2004 |
| CN | 1532037 A | 9/2004 |
| CN | 101275410 A | 10/2008 |
| CN | 101618611 A | 1/2010 |
| CN | 102108769 A | 6/2011 |
| CN | 201891191 U | 7/2011 |
| CN | 102251638 A | 11/2011 |
| CN | 106032686 A | 10/2016 |
| CN | 106084749 A | 11/2016 |
| CN | 107163209 A | 9/2017 |
| EA | 025741 B1 | 1/2017 |
| EP | 0013731 A1 | 8/1980 |
| EP | 1516720 A1 | 3/2005 |
| EP | 2644374 A1 | 10/2013 |
| JP | 02277623 A | 11/1990 |
| RU | 2441119 C2 | 8/2009 |
| RU | 150450 U1 | 2/2015 |
| RU | 2645558 C2 | 2/2018 |
| WO | 0222702 A1 | 3/2002 |
| WO | 03012224 A1 | 2/2003 |
| WO | 2013053566 A1 | 4/2013 |
| WO | 2013098859 A1 | 7/2013 |
| WO | 2014158512 A1 | 10/2014 |
| WO | 2015091801 A1 | 6/2015 |
| WO | 2015161024 A1 | 10/2015 |

OTHER PUBLICATIONS

Italian Search Report and Written Opinion pertaining to Italian Patent Application No. 102017000136495, dated Jun. 5, 2018.
International Search Report and Written Opinion pertaining to PCT/US2018/059522, dated Jan. 16, 2019.
International Search Report and Written Opinion pertaining to PCT/US2018/059525, dated Jan. 22, 2019.
Italian Search Report and Written Opinion pertaining to Italian Patent Application No. 102017000136482, dated May 18, 2018.
Article 94(3) dated Feb. 25, 2022, pertaining to EP Patent Application No. 18882743.0, 7 pgs.
Article 94(3) dated Oct. 21, 2021, pertaining to EP Patent Application No. 18883528.4, 4 pgs.
Office Action dated Mar. 1, 2022, pertaining to RU Patent Application No. 2020120512, 10 pgs.
Examination Report dated Mar. 25, 2022, pertaining to IN Patent Application No. 202017023542, 7 pgs.
Office Action dated Mar. 10, 2022, pertaining to RU Patent Application No. 2020120216, 11 pgs.
European Office Action dated Oct. 26, 2021, pertaining to European Patent Application No. 18759536.8, 10 pgs.
Russian Office Action dated Dec. 16, 2021, pertaining to Russian Patent Application No. 2020119817, 8 pgs.
Indian Office Action dated Dec. 31, 2021, pertaining to Indian Patent Application No. 202017023541, 5 pgs.

* cited by examiner

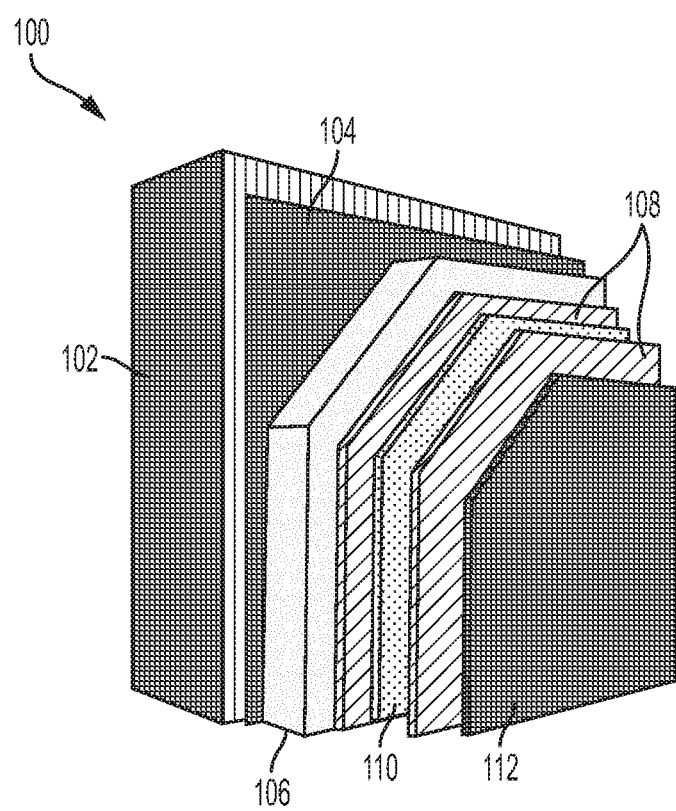

GLASS FIBER-REINFORCED POLYURETHANE/POLYISOCYANURATE FOAM INSULATION BOARD

CROSS-REFERENCE TO RELATED APPLICATION

This application is a National Stage Entry under 35 U.S.C. 0371 of International Patent Application No. PCT/US2018/047840, filed Aug. 24, 2018, which claims priority to Italian Patent Application No. 102017000136495, filed on Nov. 28, 2017, the entire disclosures of which are hereby incorporated by reference.

TECHNICAL FIELD

Embodiments of the present disclosure are generally related to polyurethane/polyisocyanurate foam insulation boards, and are more specifically related to glass fiber-reinforced polyurethane/polyisocyanurate foam insulation boards having a density of less than 70 kg/m$^3$.

BACKGROUND

Insulation systems for external walls, such as concrete or masonry walls, have been proposed. The combination of the thermal insulation product applied on the outer face of the external wall and faced by a rendering system is referred to as an external thermal insulation composite system (ETICS). External thermal insulation composite systems are often the preferred choice in construction over other solutions, both for new dwellings and for refurbishment of existing building stock.

Most common external thermal insulation composite systems employ expanded polystyrene (EPS) as in insulating material. Polyurethane and polyisocyanurate foams may typically provide certain favorable properties over lower cost alternatives, such as thermal insulation, strength, and limited water uptake. However, such foams may exhibit diminished dimensional stability as compared to EPS. Accordingly, it is proposed to combine glass fiber-reinforced polyisocyanurate foam insulation boards with external walls in external thermal insulation composite systems.

SUMMARY

According to one or more embodiments herein, an external thermal insulation composite system includes a concrete or masonry wall and a thermal insulation board on the concrete or masonry wall. The thermal insulation board includes a polyurethane/polyisocyanurate foam reinforced with glass fibers and having a density of less than 70 kg/m$^3$ according to ASTM D 1622.

BRIEF DESCRIPTION OF THE DRAWINGS

FIG. 1 illustrates an exemplary external thermal insulation composite system.

DETAILED DESCRIPTION

Referring to FIG. 1, an external thermal insulation composite system 100 may include an external wall 102, such as a concrete or masonry wall. Masonry, also known as stonework or brickwork, may include relatively large units (stone, bricks, blocks, etc.) that are bound together by mortar into a monolithic structure. Concrete is made of cement, aggregates and water and may be set into place to create a structure without units.

The external thermal insulation composite system 100 may further include an adhesive 104 disposed directly on an outer surface of the external wall 102. The adhesive 104 may be placed between the outer surface of the external wall 102 and an insulation component 106. In various embodiments, the adhesive 104 may be a flexible adhesive, such as a foam adhesive, silicone adhesive, hot melt adhesive, or cold melt adhesives. In some particular embodiments, the adhesive may be a polyurethane or polyisocyanurate foam adhesive, such as the polyurethane or polyisocyanurate foam adhesive commercially available as Insta-Stik™ from The Dow Chemical Company (Midland, Mich.). Although various embodiments described herein describe an adhesive 102 for attaching the insulation component 106 to the external wall 102, it is contemplated that the insulation component 106 may be attached to the external wall 102 in other ways, such as through the use of a mechanical fixing device.

According to various embodiments, the insulation component 106 may be a thermal insulation board that includes a polyurethane/polyisocyanurate foam reinforced with glass fibers. As used herein, the term "polyurethane" encompasses polyurethane, polyurethane/polyurea, and polyurethane/polyisocyanurate materials. As used herein, the term "polyurethane/polyisocyanurate foam layer" refers to foam layers comprising polyurethane and polyisocyanurate. The polyurethane/polyisocyanurate foam of various embodiments has a density of less than 70 kg/m$^3$ according to ASTM D 1622, as will be described in greater detail below. Additionally, in various embodiments, the insulation component 106 exhibits dimensional changes measured as the sum of absolute values below 1.5% when exposed to 90% Relative Humidity (RH) at 70° C. for 2 days and 25% RH at 70° C. for 2 days. In various embodiments, the insulation component 106 may include at least one facing layer.

Still referring to FIG. 1, the external thermal insulation composite system 100 may further include one or more base coat layers 108 separated from the adhesive 104 by the insulation component 106. Although the embodiment depicted in FIG. 1 includes two base coat layers 108, it is contemplated that in some embodiments, the external thermal insulation composite system 100 may include three or more base coat layers, one base coat layer, or even no base coat layers.

The external thermal insulation composite system 100 depicted in FIG. 1 also includes a reinforcing mesh 110 positioned between the two base coat layers 108. In various embodiments, the reinforcing mesh 110 may be a polymer coated glass-fiber mesh fabric. The glass-fiber mesh fabric may, in some particular embodiments, have a weight of 100 to 220 g/m, or a weight of 140 to 180 g/m.

Finally, a top coat 112 is positioned on the external thermal insulation composite system 100. The top coat 112 may include, by way of example and not limitation, grained and scratched renders, decorative panels, brick effects, or actual brick slips. Other types of top coats are contemplated, depending on the particular embodiment.

Polyurethane/Polyisocyanurate Foam Layer

In various embodiments, the polyurethane/polyisocyanurate layer may be formed from a polymer matrix formed by reacting an isocyanate-reactive component with an isocyanate component and reinforced with one or more expandable glass webs. In particular, the polymer matrix may include urethane groups, isocyanurate groups, and/or urea groups. The polyurethane/polyisocyanurate formulation for forming the polyurethane/polyisocyanurate foam may be prepared from a multi-component system which relies on the formation of polyurethane polymers that are the reaction product of an isocyanate moiety provided from an isocyanate component with an isocyanate-reactive moiety provided from an isocyanate-reactive component to form polyurethane/polyisocyanurate polymers. The resultant polyurethane/polyisocyanurate foam has an applied density from 25 kg/m³ to 75 kg/m³ (e.g., 30 kg/m³ to 70 kg/m³, 30 kg/m³ to 50 kg/m³, 35 kg/m³ to 45 kg/m³, etc.) according to ASTM D-1622.

The isocyanate-reactive component includes one or more polyols. In various embodiments the polyol may be a polyester polyol. Various molecular weights are contemplated for the polyester polyol. The polyester polyol may contain multiple ester groups per molecule and have an average of at least 1.5 hydroxyl groups per molecule, at least 1.8 hydroxyl groups per molecule, or at least 2 hydroxyl groups per molecule. It may contain up to 6 hydroxyl groups per molecule in some embodiments, but, in other embodiments, will contain up to about 3 hydroxyl groups per molecule. The hydroxyl equivalent weight of the polyester polyol can range from about 75 to 4000 or from 150 to 1500 mgKOH/g.

Suitable polyester polyols include reaction products of hydroxylated compounds with polycarboxylic acids or their anhydrides. For example, polyester polyols may be the reaction products of diols with dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The hydroxylated compounds used in making the polyester polyols may have an equivalent weight of 150 or less, 140 or less, or 125 or less. The hydroxylated compounds may include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerin, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol, polyethylene glycol, and the like.

The polyester polyol may be the reaction product of aromatic dicarboxylic acids and/or their derivatives with hydroxylated compounds such as diethylene glycol, polyethylene glycols, or glycerine. The one or more polyols may have a hydroxyl number from 50 mg KOH/g to 550 mg KOH/g, or from 100 to 550 mg KOH/g.

The polyester polyol may include from 30 wt % to 50 wt % terephthalic acid or phthalic anhydride, from 5 wt % to 20 wt % of diethyleneglycol, and from 40 wt % to 70 wt % of polyethylene glycol. For example, the polyester polyol may include 31.5 wt % of terephthalic acid or phthalic anhydride, 8.5 wt % of diethylene glycol, and 60 wt % of polyethylene glycol. Examples of commercially available polyester polyols, made of phthalic anhydride and suitable for use include those available under the tradename STEPANPOL™ (available from Stepan Company), examples of which include STEPANPOL™ 3152, STEPANPOL™ PS 2352, and STEPANPOL™ PS 70L.

Other types of polyols may be used in addition to those provided above. For example, aromatic or aliphatic polyester polyols, aliphatic or aromatic polyether-ester polyols, and polyols obtained from vegetable derivatives may be used. Accordingly, various combinations of polyols may be used to form the isocyanate-reactive component. For example, other example polyols include VORANOL™ RN490 and VORANOL™ RH360 (polyether polyols formed by adding propylene oxide to sucrose and glycerine and having an average functionality greater than 4 and an EW of 115 and 156, respectively), VORANOL™ RN482 (polyether polyol formed by adding propylene oxide to sorbitol and having a nominal functionality of 6 and an EW of 115), TERCAROL™ 5903 (polyether polyol formed by adding propylene oxide to toluenediamine and having a nominal functionality of 4 and an EW of 127), all available from The Dow Chemical Company (Midland, Mich.).

Other additives, such as chain extenders, cross-linkers, and the like may also be included. Example chain extenders include dipropylene glycol, tripropylene glycol, diethyleneglycol, polypropylene, and polyethylene glycol. The optional chain extender component may include a chain extender that has two isocyanate-reactive groups per molecule and may have an equivalent weight per isocyanate-reactive group of less than 400. The optional crosslinker component may include at least one crosslinker that has three or more isocyanate-reactive groups per molecule and an equivalent weight per isocyanate-reactive group of less than 400.

In various embodiments, the polyurethane/polyisocyanurate layer includes a physical blowing agent. As used herein, "physical blowing agents" are low-boiling liquids which volatilize under the reaction conditions to form the blowing gas. Exemplary physical blowing agents include hydrocarbons, fluorocarbons, hydrofluorocarbons, hydrofluoroolefins, hydrochlorofluoroolefins, and other halogenated compounds.

The isocyanate component may include isocyanate-containing reactants that are aliphatic, cycloaliphatic, alicyclic, and/or aromatic polyisocyanates and derivatives thereof. Derivatives may include, by way of example and not limitation, allophanate, biuret, and NCO-terminated prepolymers. According to some embodiments, the isocyanate component includes at least one aromatic isocyanate (e.g., at least one aromatic polyisocyanate). For example, the isocyanate component may include aromatic diisocyanates such as at least one isomer of diphenyl methylene diisocyanate (MDI), crude MDI, and/or higher functional methylene polyphenol polyisocyanate. As used herein, MDI refers to polyisocyanates selected from diphenylmethane diisocyanate isomers, polyphenyl methylene polyisocyanates, and derivatives thereof bearing at least two isocyanate groups. The crude, polymeric, or pure MDI may be reacted with polyols or polyamines to yield modified MDI. Blends of polymeric and monomeric MDI may also be used. In some embodiments, the MDI has an average of from 2 to 3.5 (e.g., from 2 to 3.2) isocyanate groups per molecule. Example isocyanate-containing reactants include those commercially available under the tradename VORANATE™ from The Dow Chemical Company (Midland, Mich.), such as VORANATE™ M229 PMDI isocyanate (a polymeric methylene diphenyl diisocyanate with an average of 2.7 isocyanate groups per molecule) or VORANATE™ M600 PMDI isocyanate.

An isocyanate index for the polyisocyanurate layer may be greater than 180, greater than greater than 250, greater than 350, greater than 400, greater than 450, greater than 500, and/or greater than 550. The isocyanate index may be less than 1000. For example, in some embodiments, the isocyanate index may be from 250 to 600, from 250 to 450, etc. As used herein, "isocyanate index" is the number of equivalents of isocyanate-containing compound added per 100 theoretical equivalents of isocyanate-reactive compound. Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms. An isocyanate index of 100 corresponds to one isocyanate group per isocyanate-reactive hydrogen atom present, such as from water and the polyol composition. A higher isocyanate index indicates a higher amount of isocyanate-containing reactant. Without being bound by theory, a high isocyanate index is believed to lead to better thermal stability and reaction-to-fire behavior, including reduced smoke production.

A catalyst may also be included in the composition forming the polyurethane/polyisocyanurate layer. For example, the catalyst component may account for less than 5.0 wt % of a total weight of the isocyanate-reactive component. Example catalysts that may comprise tertiary amines such as triethylenediamine, or organometallic compounds such as dibutyltin dilaurate. Example catalysts that may be used include trimerization catalysts, which promote reaction of isocyanate with itself, such as tris(dialkylaminoalkyl)-s-hexahydrotriazines (such as 1,3,5-tris(N,N-dimethylaminopropyl)-s-hexahydrotriazine, DABCO™ TMR 30, DABCO™ K-2097 (potassium acetate), DABCO™ K15 (potassium octoate), POLYCAT™ 41, POLYCAT™ 43, POLYCAT™ 46, DABCO™ TMR, DABCO™ TMR 31, tetraalkylammonium hydroxides (such as tetramethylammonium hydroxide), alkali metal hydroxides (such as sodium hydroxide), alkali metal alkoxides (such as sodium methoxide and potassium isopropoxide), and alkali metal salts of long-chain fatty acids having 10 to 20 carbon atoms (and in some embodiments, pendant hydroxyl groups).

Examples of suitable surfactants are compounds which serve to support homogenization of the starting materials and may also regulate the cell structure of the foamed plastics. Specific examples include foam stabilizers, such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil; and cell regulators, such as paraffins, fatty alcohols, and dimethylpolysiloxanes. The surfactants are usually used in amounts of 0.01 to 5 parts by weight, based on 100 parts by weight of the polyol component.

In various embodiments, the polyurethane/polyisocyanurate layer further includes a nucleating agent, which may be added in order to control the size of foam cells. Without being bound by theory, it is believed that smaller cell size positively affects the thermal insulation properties of the polyisocyanurate layer. Nucleating agents include perfluorohydrocarbons, perfluoro-ethers, perfluoroolefins, inorganic substances such as calcium carbonate, talc, clay, titanium oxide, silica, barium sulfate, diatomaceous earth, mixtures of citric acid and sodium bicarbonate, and the like. One suitable commercially available nucleating agent is Foam Additive FA-188, available from 3M (St. Paul, Minn.). The amount of nucleating agent employed preferably ranges from about 0.01 to about 5 parts by weight per hundred parts by weight of a polymer resin. A more preferred range is from 0.1 to about 3 parts by weight.

Additionally, in some embodiments, the polyurethane/polyisocyanurate layer further includes at least one flame retardant. The flame retardant may be present in an amount from 1 wt % to 50 wt % (e.g., 1 wt % to 30 wt %, 1.5 wt % to 20 wt %, 1.5 wt % to 10 wt %, 1.5 wt % to 8 wt %, 2 wt % to 5 wt %, 2.5 wt % to 4 wt %, 2.5 wt % to 3.5 wt %, etc.), based on the total weight of the composition for forming the polyisocyanurate layer. The flame retardant may be a solid or a liquid, and include a non-halogenated flame retardants, a halogenated flame retardant, or combinations thereof. Example flame retardants include, by way of example and not limitation, phosphorous compounds with or without halogens, nitrogen based compounds with or without halogens, chlorinated compounds, brominated compounds, and boron derivatives.

According to some embodiments, the polyurethane/polyisocyanurate layer has a reinforced structure due to the presence of one or more glass fiber mats. Preferred glass fiber mats are of the type commonly known as expandable. Due to the low binder content of the glass fiber mat, such expandable glass fiber mats separate under the influence of the expanding foam in such a manner as to be evenly distributed throughout the foam in planes substantially parallel to the plane of the facing sheets. Suitable glass fiber mats may have a weight per unit area of 20 g/m$^2$ to 200 g/m$^2$, 30 g/m$^2$ to 100 g/m$^2$, more preferably about 70 g/m$^2$. Depending on the foam layer thickness one or more glass fiber mats may be used. One commercially available glass fiber mat suitable for use in various embodiments is Firmat 70 available from Schmelzer Industries.

In various embodiments, the polyurethane/polyisocyanurate layer has a density of less than 70 kg/m$^3$ or even less than 50 kg/m$^3$ when measured according to ASTM D 1622. For example, the polyisocyanurate layer may have a density of from 20 kg/m$^3$ to 70 kg/m$^3$, from 25 kg/m$^3$ to 60 kg/m$^3$, from 28 kg/m$^3$ to 50 kg/m$^3$, or from 30 kg/m$^3$ to 50 kg/m$^3$.

The polyurethane/polyisocyanurate layer may have a thickness from 1 mm to 500 mm. For example, the polyurethane/polyisocyanurate layer may have a thickness from 10 mm to 450 mm, from 10 mm to 400 mm, from 10 mm to 300 mm, from 10 mm to 250 mm, from 10 mm to 100 mm, or the like.

The polyurethane/polyisocyanurate layer may be formed by reacting the isocyanate-reactive component with the isocyanate-containing reactant to form a polymer matrix, along with any additives. The polyurethane/polyisocyanurate foam may be formed by a spraying and/or pouring application that applies the polyisocyanurate system on a base substrate and/or a surface. The spraying and/or pouring application may be done on a conveyor device, e.g., in a continuous manner.

In one particular embodiment, the polyurethane/polyisocyanurate layer may be formed by dispensing the polyurethane/polyisocyanurate system onto a first expandable glass web. Optionally, a second expandable glass web may be disposed on top of the polyurethane/polyisocyanurate system, and the layers may be passed between two rotating rolls and cured. In some embodiments, a first facing layer may be disposed beneath the first expandable glass web and a second facing layer may be disposed on top of the optional second expandable glass web and/or the polyurethane/polyisocyanurate system.

Facing Layer

As provided above, in some embodiments, the insulation component 106 may further include at least one facing layer. In various embodiments, the facing layer is a non-metal based facing layer, such as a glass-fleece based material. As used herein, "glass-fleece based material" refers to a material that includes glass fleece, such as a glass-fleece substrate. The glass-fleece may be a saturated glass-fleece or a non-saturated glass fleece.

In some embodiments, a second facer layer may be included on the insulation component 106 on the opposite face from the first facing layer. The first and second facing layers may be made from the same or different materials. In other words, the material of the first and second facing layers may be independently selected from glass based material that includes glass fleece and polymer membrane based material. Each facing layer may independently have a thickness from 0.01 mm to 3 mm (e.g., 0.05 to 0.6 mm, 0.05 to 0.1 mm, 0.07 to 0.09 mm, etc.). According to one particular embodiment, the first facing layer may be made of the same material and have the same thickness as the second facing layer.

Example materials suitable for use as facing layers include, for example glass-fleece or glass tissues that may be mineral or bituminous coated. In various embodiments, the glass-fleece may help meet requirements for Euroclass C fire reaction classification.

Alternatively, in some embodiments, the insulation component 106 may have a peel-able facing layer. In such embodiments, the peel-able facing layer may be removed from the insulation component 106 before the insulation component 106 is used. Examples of peel-able facings include polyolefin films (such as, but not limited to, polypropylene and polyethylene), polyhalogenated polyolefins, waxed paper and waxed plastic films, plastic and composite foils. The removable film may be peeled off while the board travels out of the continuous fabrication process or removed at the time of use. The polyisocyanurate layer, once the peel-able film is removed, allows further processing such as machining to provide a rough surface and/or troughs across at least part of the thickness. This may help reduce stresses and/or help interlocking with other materials once installed. In certain other embodiments, the peel-able facings are removed just before use. In such embodiments, the removable facings are preferably selected among diffusion proof foils to preserve the thermal insulation value as long as possible before use.

In various embodiments, the polyurethane/polyisocyanurate layer may be formed on the facing layer. For example, the polyurethane/polyisocyanurate layer may be formed on a surface of the facing layer by application of a liquid reaction mixture to the facing.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

Polyol A is a polyol mixture of i) 42.5 parts by weight (pbw) of STEPANPOL™ PS 2352 (a polyester polyol available from Stepan), ii) 31.9 pbw of a terephthalic acid based polyester polyol having OH number 215 and functionality 2, iii) 10.7 pbw of a terephthalic acid based polyester polyol having OH number 315 and functionality 2.4, iv) 15 pbw of non reactive flame retardant, v) 0.80 pbw of water, vi) 4 pbw of siloxane-polyether surfactant, and vii) 1 pbw of POLYCAT™ 5;

Polyol B is a polyol mixture of i) 63.3 pbw of a terephthalic acid based polyester polyol having OH number 215 and functionality 2, ii) 21 pbw of a terephthalic acid based polyester polyol having OH number 315 and functionality 2.4, iii) 15 pbw of non reactive flame retardant, iv) 0.80 pbw of water, v) 4 pbw of siloxane-polyether surfactant, and vii) 1 pbw of POLYCAT™ 5;

VORANATE™ M 600 is polymeric methylene diphenyl di-isocyanate (PMDI), available from The Dow Chemical Company (Midland, Mich.);

DABCO™ TMR7 is a catalyst, available from Evonik

DABCO™ K-2097 is a catalyst, available from Evonik;

POLYCAT™ 5 is a pentamethyl diethylene triamine catalyst available from Air Products and Chemicals Inc.; and FA-188 is a foam additive available from 3M (St. Paul, Minn.).

Example 1

The polyurethane/polyisocyanurate layers of Samples 1 and 2, and Comparative Samples A and B were prepared according to the formulations in Table 1.

TABLE 1

| Formulation of Polyurethane/Polyisocyanurate Layer (pbw) | | |
|---|---|---|
| | Sample 1 | Sample 2 |
| Isocyanate-reactive Component | | |
| Polyol A | 105 | 105 |
| Blowing Agent | 20 | 20 |
| FA-188 | 0 | 4 |
| Catalyst | | |
| DABCO ™ K-2097 | 1.5 | 1.5 |
| Isocyanate Component | | |
| VORANATE ™ M 600 (PMDI) | 264 | 264 |

The blowing agent in Table 1 is a mixture of 70 wt % of cyclopentane and 30 wt % of iso-pentane.

Samples 1 and 2 included a polyurethane/polyisocyanurate layer prepared according to the formulations in Table 1 by pouring the formulations in Table 1 into a 300 mm×300 mm×100 mm horizontal mold heated at 55° C. using an Afros Cannon HP machine equipped with an FPL 14 mixing head. The formulations were poured on top of a layer of expandable glass web (Firmat 70). A facer was gently pressed over the reacting mixture to help impregnation of the glass web. The reaction mixture was allowed to rise, fill the cavity, and cure. The panels were demolded 5 minutes after the pouring of the reaction mixture. For each of Samples 1 and 2, the cream time was 5 seconds and the gel time was 28 seconds.

Comparative Samples A and B were prepared using the formulations of Samples 1 and 2, respectively. Comparative Samples A and B were prepared using the same formulations as Samples 1 and 2, respectively, but did not include a layer of expandable glass web.

Specimens were cut from the panels for characterization of foam density (measured according to ASTM D 1622), mechanical properties (including compression according to EN 826 and tensile strength of a dog-bone shaped specimen according to ASTM D 3574), and dimensional stability (DS) undergoing a four day exposure, consisting of 2 days at 70° C. at 90% Relative Humidity (RH) followed by two additional days at 70° C. at 25% RH. The results are shown in Table 2.

TABLE 2

Test Results for Comparative Samples A and B and Samples 1 and 2

| | Comparative Sample A | Comparative Sample B | Sample 1 | Sample 2 |
|---|---|---|---|---|
| Density (kg/m3) | 39.7 | 39.1 | 42.4 | 41.4 |
| Compressive Strength – length (kPa) | 290 ± 46 | 181 ± 28 | 233 ± 35 | 219 ± 21 |
| Compressive Strength – width (kPa) | 195 ± 22 | 197 ± 40 | 206 ± 25 | 190 ± 60 |
| Compressive Strength (width/length) | 0.67 | 1.09 | 0.88 | 0.87 |
| Average Compressive Strength (kPa) | 242 ± 61 | 189 ± 32 | 220 ± 31 | 204 ± 43 |
| Compressive modulus – length (MPa) | 9.12 ± 2.18 | 4.18 ± 1.21 | 5.80 ± 1.48 | 5.98 ± 0.59 |
| Compressive modulus – width (MPa) | 4.17 ± 0.92 | 4.65 ± 1.78 | 4.28 ± 0.86 | 4.46 ± 1.37 |
| Average Compressive Modulus (MPa) | 6.65 ± 3.10 | 4.41 ± 1.38 | 5.04 ± 1.37 | 5.22 ± 1.26 |
| Tensile Modulus – width (MPa) | 4.98 ± 0.82 | 4.52 ± 0.82 | 11.04 ± 2.21 | 9.04 ± 3.14 |
| |DS| Length + width (%) | 1.68 | 0.72 | 0.43 | 0.45 |
| DS Thickness (%) | −0.29 | −0.08 | 0.25 | 0.36 |
| Sum |DS| in all directions (%) | 1.97 | 0.98 | 0.74 | 0.83 |

Referring to Samples 1 and 2 and Comparative Samples A and B, Samples 1 and 2, which included the expandable glass web, demonstrate that the expandable glass web was effective to reduce dimensional changes when the specimen underwent a thermal/humidity load. In particular, as shown in Table 2, the compressive stress values between Comparative Samples A and B and Samples 1 and 2 are similar, respectively, but the dimensional stability (DS) is surprisingly different. Data of tensile modulus measured in the direction perpendicular to the thickness also correlate well with the dimensional stability values in the length and width directions.

Example 2

The polyurethane/polyisocyanurate layers of Sample 3, and Comparative Sample C were prepared according to the formulations described in Table 3.

TABLE 3

Formulation of Polyurethane/Polyisocyanurate Layer (pbw)

| | Sample 3 and Comparative Sample C |
|---|---|
| Isocyanate-reactive Component | |
| Polyol B | 105 |
| Blowing Agent | 22.8 |
| FA-188 | 0 |

TABLE 3-continued

Formulation of Polyurethane/Polyisocyanurate Layer (pbw)

| | Sample 3 and Comparative Sample C |
|---|---|
| Catalyst | |
| DABCO ™ TMR7 | 1.2 |
| Isocyanate Component | |
| VORANATE ™ M 600 (PMDI) | 260 |

The polyisocyanurate foam layers were prepared in a continuous line including an 18 m long forming conveyor. Sample 3 was fabricated according to the following process: i) providing as the lowermost layer a first Silcart Stonewall 300 facing, ii) providing a first layer of Firmat expandable glass web (available from Schmelzer Industries) having a weight of 7.1 grams per square feet), iii) dispensing a polyisocyanurate foam forming reaction mixture using a flow-jet device directly connected to the mixing head and positioned in the center of the width of the line, iv) providing a second layer of the Firmat expandable glass web used in step ii), v) providing as the uppermost layer a second Silcart Stonewall 300 facing, vi) passing the lowermost first facing, the first expandable glass web, the second expandable glass web, the uppermost second facing, and the reaction mixture therebetween through two rotating rolls, and vii) allowing the insulation board to cure between the two spaced apart forming conveyors heated at 70° C.

Comparative Sample C was prepared according to the process used to fabricate Sample 3, except steps ii) providing a first layer of Firmat expandable glass web (available from Schmelzer Industries) having a weight of 7.1 grams per square feet), iv) providing a second layer of the Firmat expandable glass web used in step ii), and v) providing as the uppermost layer a second Silcart Stonewall 300 facing, were omitted. Comparative Sample C also did not include glass web reinforcements. The thickness of each insulation board was 100 mm.

Samples were prepared by cutting the polyisocyanurate boards to dimensions 80 mm×80 mm. The facing materials were removed and the thickness was adjusted to 80 mm and 90 mm. The samples were tested for dimensional stability after exposure at 70° C. at 90% RH for two days followed by 25% RH for two additional days. Additionally, the thermal insulation of the boards was measured by means of a LaserComp heat flow meter instrument. The boards were cut to obtain specimens of dimensions 200 mm×200 mm×25 mm (thickness). The closed cell content was checked to exclude any effect of open cells on dimensional stability behavior. Closed cell values were measured according to ASTM D 6226 and were found to be 85% for each Sample. The results are provided in Table 4.

TABLE 4

Test Results for Comparative Sample C and Sample 3

|  | Comparative Sample C | Sample 3 |
|---|---|---|
| Density (kg/m$^3$) | 30.9 | 37.4 |
| Thermal conductivity at 10° C. (mW/mK) | 20.96 | 21.75 |
| Dimensional Stability - thickness reduced to 80 mm (%) | | |
| Width | −0.76 | −0.28 |
| Length | 0.22 | −0.19 |
| Thickness | 3.65 | 0.20 |
| IDs/Sum of all Directions | 4.63 | 0.67 |
| Dimensional Stability - thickness reduced to 90 mm (%) | | |
| Width | −0.59 | 0.14 |
| Length | −0.03 | −0.40 |
| Thickness | 3.34 | 0.28 |
| IDs/Sum of all Directions | 3.96 | 0.82 |

The data in Table 4 shows the effect of the glass web reinforcement on dimensional stability. Additionally, the thermal conductivity values showed that the presence of the embedded glass fiber may slightly worsen thermal insulation. However, the major improvement in dimensional stability may outweigh this decrease in thermal insulation. Additionally, it is notable that the thermal insulation values of Sample 3 are still improved over conventional insulation products used for ETICS applications, such as EPS, grey EPS, or mineral wool.

Example 3

A ETICS system was built using an insulation component based on a high index polyurethane/polyisocyanurate glass web reinforced polyurethane/polyisocyanurate formulation having an isocyanate index of 350. In particular, the insulation component was 100 cm×50 cm and 100 mm thick and assembled on an ETAG 004 testing rig, 2.5×2 m. Half of the surface of the rig was insulated.

The ETICS kit was built using Marmorit SM700 Pro mineral adhesive (available from Knauf) around the perimeter and dots in the middle with a minimum of 40% of the surface of the European Technical Approval Guidelines (ETAG) wall covered, applying the insulation component, applying a base coat of Marmorit SM700 Pro (5-7 mm), applying a 5 mm×5 mm glass fiber layer, and applying a top coat of Knauf Addi S (1.5-3 mm) silicone reinforced plaster (available from Knauf). After curing according to the kit specifications, hygrothermal cycles as provided by ETAG 004 were started. The cycles were performed are described in Table 5 below.

TABLE 5

| Hygrothermal cycles | | |
|---|---|---|
| | Duration | Cycle |
| 1 | 2 days | Hot cycle (70° C.) |
| 2 | 20 days | Hot-rain cycle (70° C. + rain) |
| 3 | 8 days | Hot-cold cycle (50° C. − 20° C.) |
| 4 | 13 days | Room temperature (23° C.) |
| 5 | 20 days | Hot-rain cycle (70° C. + rain) |
| 6 | 8 days | Hot-cold cycle (50° C. − 20° C.) |
| 7 | 7 days | Hot cycle (70° C.) |

Following the cycles, the ETICS system was examined and exhibited no failures

Various embodiments described herein exhibit improved dimensional stability while providing improved insulation as compared to conventional thermal insulation products. Accordingly, various embodiments described herein may be employed in external thermal insulation composite systems where improved insulation and dimensional stability is desired.

It is further noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. An external thermal insulation composite system, comprising:
   (i) a concrete or masonry wall;
   (ii) a thermal insulation board on an external surface of the concrete or masonry wall, the thermal insulation board comprising a polyurethane/polyisocyanurate rigid foam reinforced with glass fibers, wherein the polyurethane/polyisocyanurate foam has a density of less than 70 kg/m$^3$ according to ASTM D 1622;
   wherein the polyurethane/polyisocyanurate foam has an isocyanate index of from 180 to 600; and
   wherein the polyurethane/polyisocyanurate foam has a reinforced structure due to being cured in the presence of one or more glass fiber mats.

2. The external thermal insulation composite system as claimed in claim 1, wherein the polyurethane/polyisocyanurate foam is the reaction product of a mixture that includes at least a first isocyanate component, a first isocyanate-reactive component, a trimerization catalyst, a surfactant, a physical blowing agent, and optionally a nucleating agent.

3. The external thermal insulation composite system as claimed in claim 2, wherein the physical blowing agent is selected from the group consisting of hydrocarbons, hydrochlorofluoroolefins, hydrofluoroolefins, and mixtures thereof.

4. The external thermal insulation composite system as claimed in claim 2, wherein the nucleating agent is selected from the group consisting of perfluoro-hydrocarbons, perfluoro-ethers, perfluoroolefins, and mixtures thereof.

5. The external thermal insulation composite system as claimed in claim 1, wherein the thermal insulation board further includes at least one facing layer selected from at least one of saturated glass-fleece and non-saturated glass-fleece.

6. The external thermal insulation composite system as claimed in claim 1, wherein the thermal insulation board further includes at least a removable facing material, and the removable facing material is removed before use.

7. The external thermal insulation composite system as claimed in claim 1, wherein the thermal insulation board exhibits dimensional changes measured as the sum of absolute values below 1.5% when exposed to 90% RH at 70° C. for 2 days and 25% RH at 70° C. for 2 days.

8. A method of preparing the external thermal insulation composite system of claim 1, comprising:
 attaching the thermal insulation board to the external surface of the concrete or masonry wall using an adhesive or mechanical fixing device; and
 applying a reinforced coating comprising glass fiber mesh on the thermal insulation board attached to the external surface of the concrete or masonry wall.

9. The method of claim 8, wherein the insulation board is produced in a continuous process comprising curing the polyurethane/polyisocyanurate foam in the presence of the glass fibers in the form of a glass fiber web reinforcement under two spaced apart opposed forming conveyors.

* * * * *